United States Patent [19]
Abe et al.

[11] Patent Number: 6,157,741
[45] Date of Patent: Dec. 5, 2000

[54] IMAGE PROCESSING APPARATUS AND IMAGE PROCESSING METHOD

[75] Inventors: Shuji Abe, Setagaya-ku; Michihiro Fukushima, Yokohama, both of Japan

[73] Assignee: Kabushiki Kaisha Toshiba, Kawasaki, Japan

[21] Appl. No.: 09/031,050

[22] Filed: Feb. 26, 1998

[30] Foreign Application Priority Data

Feb. 27, 1997 [JP] Japan ................................... 9-044360

[51] Int. Cl.⁷ .............................. G06K 9/46; G06T 9/00
[52] U.S. Cl. .................... 382/233; 382/236; 382/239; 382/250; 382/251; 348/405; 348/410; 375/245
[58] Field of Search ................................. 382/251, 239, 382/248, 250, 236, 238; 348/400–421; 341/200; 375/243, 244, 245; 358/432, 433

[56] References Cited

U.S. PATENT DOCUMENTS

| | | | |
|---|---|---|---|
| 4,807,250 | 2/1989 | Tanaka | 375/28 |
| 5,309,183 | 5/1994 | Sasaki et al. | 382/173 |
| 5,440,344 | 8/1995 | Asamura et al. | 348/405 |
| 5,517,327 | 5/1996 | Nakatami et al. | 358/462 |
| 5,612,746 | 3/1997 | Slavin | 348/420 |
| 5,613,015 | 3/1997 | Suzuki et al. | 382/173 |
| 5,638,464 | 6/1997 | Kawamura | 382/232 |
| 5,724,453 | 3/1998 | Ratnakar et al. | 382/251 |
| 5,850,261 | 12/1998 | Kondo et al. | 348/420 |

OTHER PUBLICATIONS

Majid Rabbani and Paul W. Jones, Digital Image Compression Techniques, pp. 79–101, Jan. 1991.

*Primary Examiner*—Jon Chang
*Attorney, Agent, or Firm*—Pillsbury Madison & Sutro LLP

[57] ABSTRACT

In the image decoding apparatus, the maximum absolute value of difference values of adjacent pixel data of each pixel block of image data is obtained as a feature of the image data. An optimum quantizing coefficient is selected for the maximum absolute value of the difference value. With the selected quantizing coefficient, the maximum absolute value is quantized. When the difference values of adjacent pixel data of each pixel block of image data concentrate in the vicinity of "0", they are quantized with a smaller quantizing coefficient. Thus, with an optimum quantizing coefficient, each pixel block of image data can be quantized. Consequently, quantizing errors can be reduced.

6 Claims, 8 Drawing Sheets

QUANTIZING TABLES

| MAXIMUM ABSOLUTE VALUE OF DIFFERENCE VALUES | DATA OF QUANTIZING TABLE | QUANTIZING COEFFICIENT |
|---|---|---|
| LESS THAN 16 | 0 0 0 0 0 | 1 |
| LESS THAN 32 | 0 0 0 0 1 | 2 |
| LESS THAN 48 | 0 0 0 1 0 | 3 |
| LESS THAN 64 | 0 0 0 1 1 | 4 |
| LESS THAN 80 | 0 0 1 0 0 | 5 |
| LESS THAN 96 | 0 0 1 0 1 | 6 |
| LESS THAN 112 | 0 0 1 1 0 | 7 |
| LESS THAN 128 | 0 0 1 1 1 | 8 |
| LESS THAN 144 | 0 1 0 0 0 | 9 |
| LESS THAN 160 | 0 1 0 0 1 | 10 |
| LESS THAN 176 | 0 1 0 1 0 | 11 |
| LESS THAN 192 | 0 1 0 1 1 | 12 |
| LESS THAN 208 | 0 1 1 0 0 | 13 |
| LESS THAN 224 | 0 1 1 0 1 | 14 |
| LESS THAN 240 | 0 1 1 1 0 | 15 |
| LESS THAN 256 | 0 1 1 1 1 | 16 |
| LESS THAN 272 | 1 0 0 0 0 | 17 |
| LESS THAN 288 | 1 0 0 0 1 | 18 |
| LESS THAN 304 | 1 0 0 1 0 | 19 |
| LESS THAN 320 | 1 0 0 1 1 | 20 |
| LESS THAN 336 | 1 0 1 0 0 | 21 |
| LESS THAN 352 | 1 0 1 0 1 | 22 |
| LESS THAN 368 | 1 0 1 1 0 | 23 |
| LESS THAN 384 | 1 0 1 1 1 | 24 |
| LESS THAN 400 | 1 1 0 0 0 | 25 |
| LESS THAN 416 | 1 1 0 0 1 | 26 |
| LESS THAN 432 | 1 1 0 1 0 | 27 |
| LESS THAN 448 | 1 1 0 1 1 | 28 |
| LESS THAN 464 | 1 1 1 0 0 | 29 |
| LESS THAN 480 | 1 1 1 0 1 | 30 |
| LESS THAN 496 | 1 1 1 1 0 | 31 |
| 496 OR MORE | 1 1 1 1 1 | 32 |

IMAGE PROCESSING APPARATUS AND IMAGE PROCESSING METHOD

BACKGROUND OF THE INVENTION

1. Field of the Invention

The present invention relates to an image processing apparatus applicable for an apparatus that decodes image data that has been compressed and encoded corresponding to the MPEG format and to an image processing method thereof.

2. Description of the Related Art

An MPEG decoding apparatus requires a memory with a large storage capacity (for example, a frame memory that stores two frames) for decoding B picture. In recent years, as technologies for reducing the storage capacity of the frame memory, a method for writing a compressed decoded image to a frame memory of an MPEG decoding apparatus has been proposed as in "A study on reduced memory approach in MPEG2 decoder systems", ITE '96 1996 ITE Annual Convention, 23–4 and in "A study on frame memory reduction in MPEG2 decoder systems", THE INSTITUTE OF ELECTRONICS, INFORMATION AND COMMUNICATION ENGINEERS PROCEEDINGS OF THE 1996 IEICE GENERAL CONFERENCE, D-320.

In "A study on reduced memory approach in MPEG2 decoder systems", a technology for compressing and encoding an image as each pixel block composed of eight horizontal pixels corresponding to a one-dimensional DPCM (Differential Pulse Code Modulation) method is disclosed. In this technology, to easily read data from the memory in a motion compensating process, the compression ratio is fixed corresponding to a four-bit non-linear quantizing method. In this technology, the first one of eight pixels is encoded with eight bits. The rest of the pixels are encoded with four bits corresponding to DPCM method (by non-linearly quantizing the difference value with the previous pixel). In this technology, data of eight pixels composed of 64 bits can be encoded with (8 bits×1 pixel)+(4 bits×7 pixels)=36 bits. Thus, the data amount can be reduced to 0.56 times the original data amount.

However, in this technology, encoded data for bits of integer bytes cannot be obtained. (Assuming that 1 byte=8 bits, 36 bits=8 bits×4+4 bits). In other words, a fragment of four bits of a byte takes place. Thus, when the memory is accessed, the following special process is required.

Data is written or read as bytes to/from the memory. Thus, to write/read fragment data (four bits) to/from the memory without a space of four bits, fragment data of four bits is read from the frame memory. The fragment data of four bits is added to the first four bits of the next data so as to form one byte. The resultant one byte is written to the frame memory. Thus, a complicated process is required.

Difference values obtained in the DPCM process range from −255 to +255. However, when an image is considered in a small range of around eight pixels, most of difference in values concentrate in the vicinity of 0. On the other hand, the values of quantizing table are fixed so that the quantization errors are reduced on the average. Thus, a small difference value is quantized with an excessively large value. Thus, the quantizing errors increase.

SUMMARY OF THE INVENTION

An object of the present invention is to provide an image processing apparatus for reducing quantizing errors and improving the image quality of a decoded image and an image processing method thereof.

Another object of the present invention is to provide an image processing apparatus for preventing a wasteful area from taking place in a memory to which compressed image data is written and for easily accessing the memory and an image processing method thereof.

To accomplish such objects, the image processing apparatus according to the present invention switches a quantizing coefficient for quantizing a difference value to an optimum quantizing coefficient corresponding to a feature of each pixel block composed of a predetermined number of pixels of input pixel data. For example, the maximum absolute value of difference values of adjacent pixels of each pixel block of image data is obtained as a feature of the image data. An optimum quantizing coefficient is selected for the maximum absolute value of the difference values and quantized. In reality, when the difference values of adjacent pixels of each pixel block of the image data concentrate in the vicinity of 0, the difference values are quantized with a small quantizing coefficient. Thus, the difference values can be quantized with an optimum quantizing coefficient for each pixel block. Consequently, quantizing errors can be reduced.

In addition, when data of a quantizing coefficient selected by the selecting means is added to output data of the quantizing means and thereby fixed length data composed of a multiple (integer) of memory access bits is generated, a wasteful area does not take place in the memory. Thus, when compressed image data is written to the memory, a special process is not required.

These and other objects, features and advantages of the present invention will become more apparent in light of the following detailed description of a best mode embodiment thereof, as illustrated in the accompanying drawings.

DESCRIPTION OF PREFERRED EMBODIMENTS

Next, an embodiment of the present invention will be described with reference to the accompanying drawings.

Figure 1:
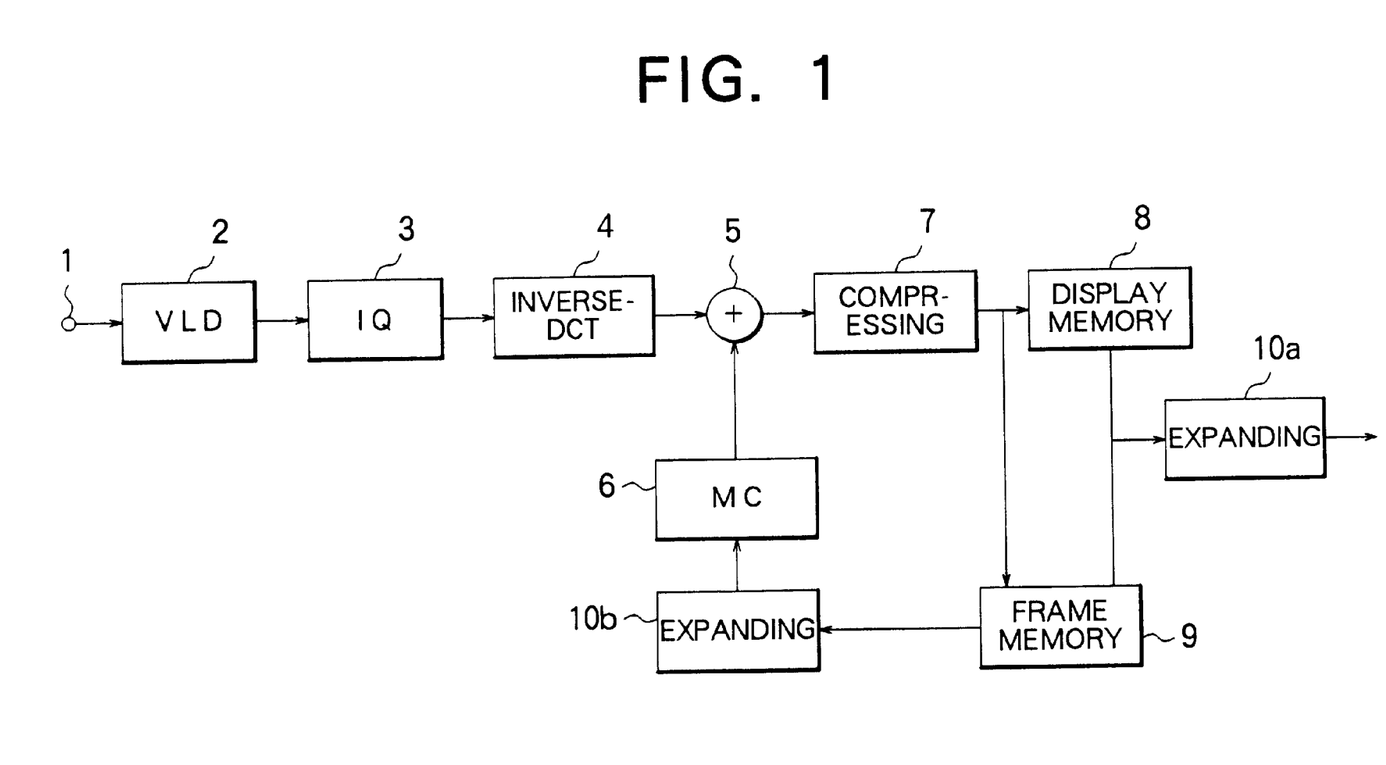
FIG. 1 is a block diagram showing the structure of an image decoding apparatus according to an embodiment of the present invention.

FIG. 1 is a block diagram showing the structure of an image decoding apparatus as an image processing apparatus according to an embodiment of the present invention.

MPEG compressed data is received from an inputting portion. The MPEG compressed data is stored in a receiving buffer (not shown). The receiving buffer compensates the difference of encoding efficiencies of I, P, and B pictures (namely, the difference of the data amounts thereof). A VLD (Variable Length Decoding) portion 2 successively performs a variable-length decoding process for data stored in the receiving buffer. The resultant variable-length decoded data is supplied to an inverse-quantizing portion (IQ) 3. The inverse-quantizing portion (IQ) 3 inversely quantizes the variable-length decoded data and supplies the inversely quantized data to a inverse-DCT portion 4. The inverse-DCT portion 4 inversely orthogonally transforms the inversely quantized data and supplies the inversely orthogonally transformed data to an adder 5.

When output data of the inverse-DCT portion 4 is image data that has been inter-frame-prediction encoded, the adder 5 adds the image data and predicted image data received from a motion compensating (MC) portion 6 and supplies the resultant data as decoded image data to a compressing portion 7. The compressing portion 7 compresses the image data received from the adder 5 and supplies the compressed image data to either a display memory 8 or a frame memory 9. An expanding portion 10a reads the compressed image data from the display memory 8 or the frame memory, expands the compressed image data and outputs the expanded image as a reproduced image so that a frame image is converted into an interlaced image. An expanding portion 10b expands the compressed image data stored in the frame memory 9 and supplies the expanded image data to the motion compensating portion 6. The motion compensating portion 6 compensates the motion of the expanded image data and supplies the resultant data as a predicted image data to the adder 5.

Figure 2:
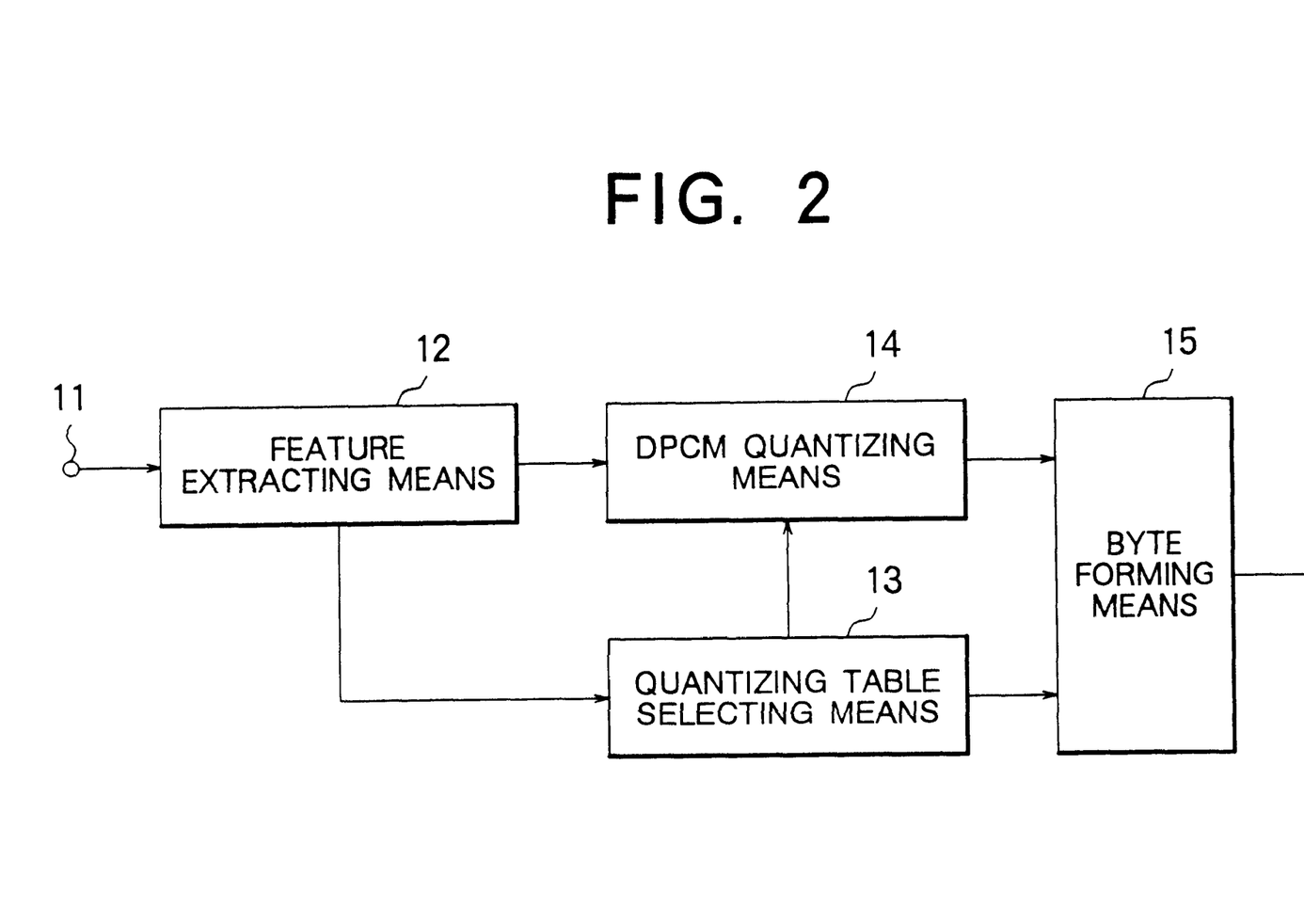
FIG. 2 is a block diagram showing the structure of a compressing portion of the image decoding apparatus shown in FIG. 1.

FIG. 2 is a block diagram showing the structure of the compressing portion 7 shown in FIG. 1.

As shown in FIG. 2, an inputting portion 11 receives the decoded image data from the adder 5 shown in FIG. 1. A feature extracting means 12 extracts a feature of each block with a fixed length of the decoded image data and supplies the resultant feature data to a quantizing table selecting means 13. In addition, the input image data is also supplied to a DPCM quantizing means 14 just through the feature extracting means 12. In this case, the image data is not processed by the feature extracting means 12.

The quantizing table selecting means 13 has a plurality of quantizing tables that have different quantizing coefficients. The quantizing table selecting means 13 selects an optimum one from the quantizing tables corresponding to the feature data received from the feature extracting means, encodes data of the selected quantizing table (five-bit data that represents a quantizing coefficient of the quantizing table), and supplies the resultant data to a byte forming means 15. In addition, the quantizing table selecting means 13 supplies the value of the selected quantizing table (quantizing coefficient) to the DPCM quantizing means 14.

The DPCM quantizing means 14 performs the DPCM (Differential Pulse Code Modulation) process for each block with the fixed length of image data that is received through the feature extracting means 12. The resultant DPCM value is quantized with the value of the quantizing table (quantizing coefficient) received from the quantizing table selecting means 13 and obtained as compressed image data. The compressed image data is supplied to the byte forming means 15.

The byte forming means 15 combines the compressed image data that is a quantized DPCM value received from the DPCM quantizing means 14 and data of the quantizing table received from the quantizing table selecting means 13 and forms bytes with the combined data (fixed length data composed of bits for integer bytes). The byte data is written to the display memory 8 or the frame memory 9 shown in FIG. 1.

Since the data is quantized by dividing the data by a quantizing coefficient, the inversely quantized data (quantized data is multiplied by a quantizing coefficient) may have an error. Thus, when data is decoded, difference values that have been inversely quantized are successively added. Thus, quantizing errors cumulate.

According to the embodiment of the present invention, to prevent quantizing errors from cumulating, the DPCM quantizing means 14 is used. The DPCM quantizing means 14 has the following structure.

Figure 3:
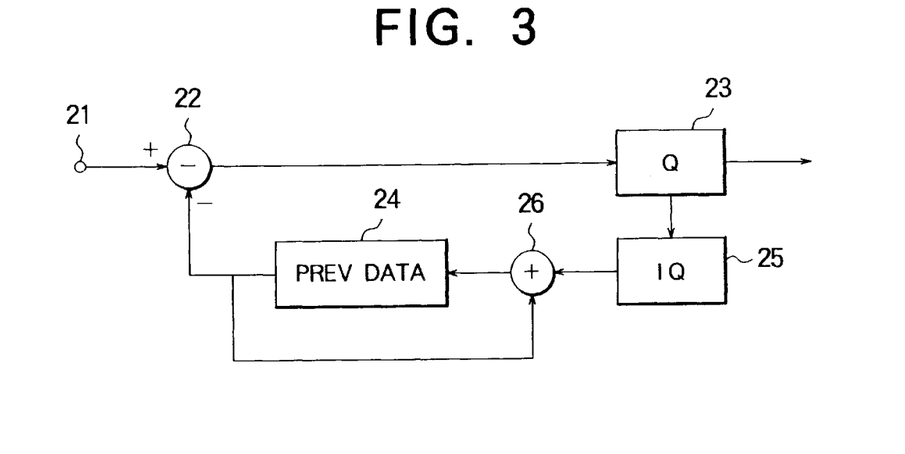
FIG. 3 is a block diagram showing the structure of a DPCM inverse-quantizing portion of the compressing portion shown in FIG. 2.

FIG. 3 is a block diagram showing the structure of the DPCM quantizing means 14. Decoded pixel data is supplied to an inputting portion 21 of the DPCM quantizing means 14. A subtracter 22 subtracts a decoded value of the previous pixel data stored in a memory 24 from the pixel data received from the inputting portion 21 and obtains a DPCM value that is a difference value of adjacent pixels. A quantizing portion 23 quantizes the DPCM value with the value (quantizing coefficient) of the quantizing table received from the quantizing table selecting means 13. The quantized DPCM value is supplied to both the byte forming means 15 and the inverse-quantizing portion (IQ) 25.

The inverse quantizing portion (IQ) 25 inversely quantizes the quantized DPCM value with the value of the quantizing table used in the quantizing process. An adder 26 adds the inversely-quantized DPCM value and the decoded value of the previous pixel data stored in the memory 24 and obtains a decoded value of new pixel data. The decoded value of the pixel data is rewritten to the memory 24 for the DPCM process for the next pixel data.

The value of the first pixel data of each pixel block with the fixed length of the image data that is input to the DPCM quantizing means 14 is directly supplied to the byte forming means 15. At this point, the value of the pixel data stored in the memory 24 is designated to "0". The values of the quantizing coefficients used in the quantizing portion 23 and the inverse-quantizing portion 24 are designated to "1".

In the image processing apparatus according to the embodiment, to prevent quantizing errors from cumulating, the inversely quantized DPCM decoded value of the previous pixel data is used in the DPCM process for the next pixel data. Alternatively, the previous pixel data can be used for the DPCM process for the next pixel data.

Next, the structure of the expanding portions 10a and 10b of the image decoding apparatus according to the embodiment will be described.

Figure 4:
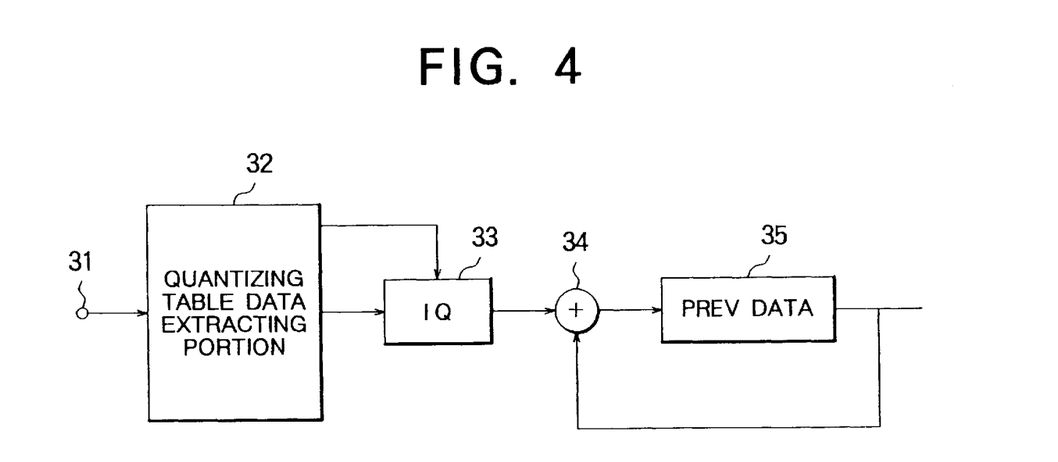
FIG. 4 is a block diagram showing the structure of an expanding portion of the image decoding apparatus shown in FIG. 1.

FIG. 4 shows the structure of the expanding portions. As shown in FIG. 4, compressed image data stored in the frame memory 9 is received from an inputting portion 31. A quantizing table data extracting portion 32 extracts data of a quantizing table from the received compressed image data and supplies the data of the quantizing table data to an inverse-quantizing portion 33. The inverse quantizing portion 33 inversely quantizes the received compressed image data (quantized DPCM value) with a quantizing coefficient represented by the data of the quantizing table extracted from the quantizing table data extracting portion 32. An adder 34 adds the inversely quantized DPCM value and the decoded value of the previous pixel data stored in a memory 35 and outputs the resultant data as decoded data through the memory 35.

Next, the operation of the byte forming means 15 will be described with reference to FIG. 5.

In this example, it is assumed that each pixel block has a fixed length of eight horizontal pixels as a one-dimensional size of a DCT block and that data is compressed to 6/8 times the original data. In addition, it is assumed that the first pixel of each pixel block with the fixed length of the compressed image data is compressed and encoded by eight bits and that the remaining seven pixels are compressed and encoded by five bits.

Figure 5:
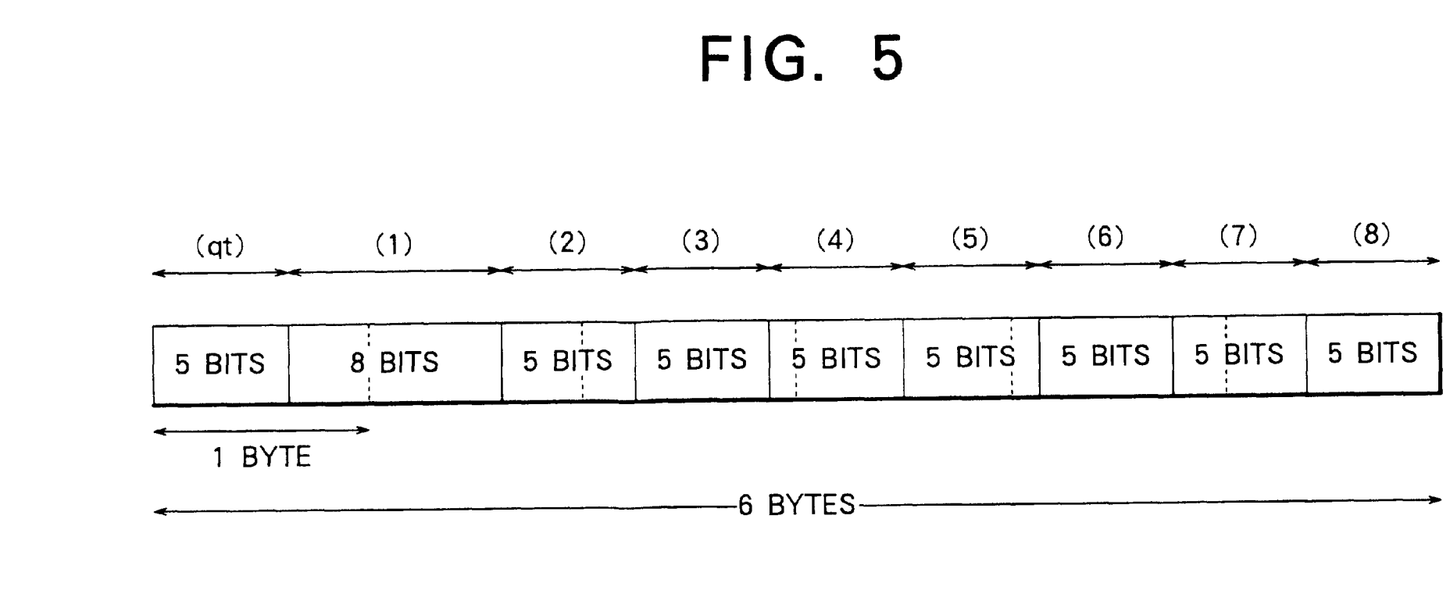
FIG. 5 is a schematic diagram for explaining the operation of a byte forming portion of the image decoding apparatus shown in FIG. 1.

A portion (1) in FIG. 5 represents eight bits of the first pixel of the eight horizontal pixels. Portions (2) to (8) each represent five bits of each pixel other than the first pixel. The number of bits except for the data of the quantizing table is (8+5×7=43 bits). When the memory is accessed with integer bytes, five bits become insufficient (a blank area takes place). Thus, when the five bits (qt) are used for the data of the quantizing table, data of six bytes can be obtained.

However, the number of bits of each pixel other than the first pixel is not always five bits. Likewise, the number of bits of data of a quantizing table is not always five bits.

When five bits are used for data of a quantizing table, up to 32 quantizing tables (namely, 32 types of quantizing coefficients) can be provided. With various quantizing tables (quantizing coefficients), when there is a large difference in maximum DPCM values of pixel blocks with a fixed length of image data, a fine quantizing table (small quantizing coefficient) is selected for a pixel block with a fixed length of image data of which the maximum DPCM value is small. In contrast, a coarse quantizing table (large quantizing coefficient) is selected for a pixel block with a fixed length of image data of which the maximum DPCM value is large. In other words, an optimum quantizing table (quantizing coefficient) can be selected.

The feature extracting means 12 shown in FIG. 2 obtains data for selecting a quantizing table with which each pixel block with a fixed length of image data is quantized from the 32 quantizing tables. In other words, the feature extracting means 12 extracts the maximum absolute value of difference value of adjacent pixels of each pixel block with a fixed length of image data as a feature of each pixel block with the fixed length of the image data. Alternatively, the distribution of difference values of adjacent pixels of each pixel block with a fixed length of image data (for example, the average value of difference values) can be determined as a feature of each pixel block with the fixed length of the image data.

Figure 6:
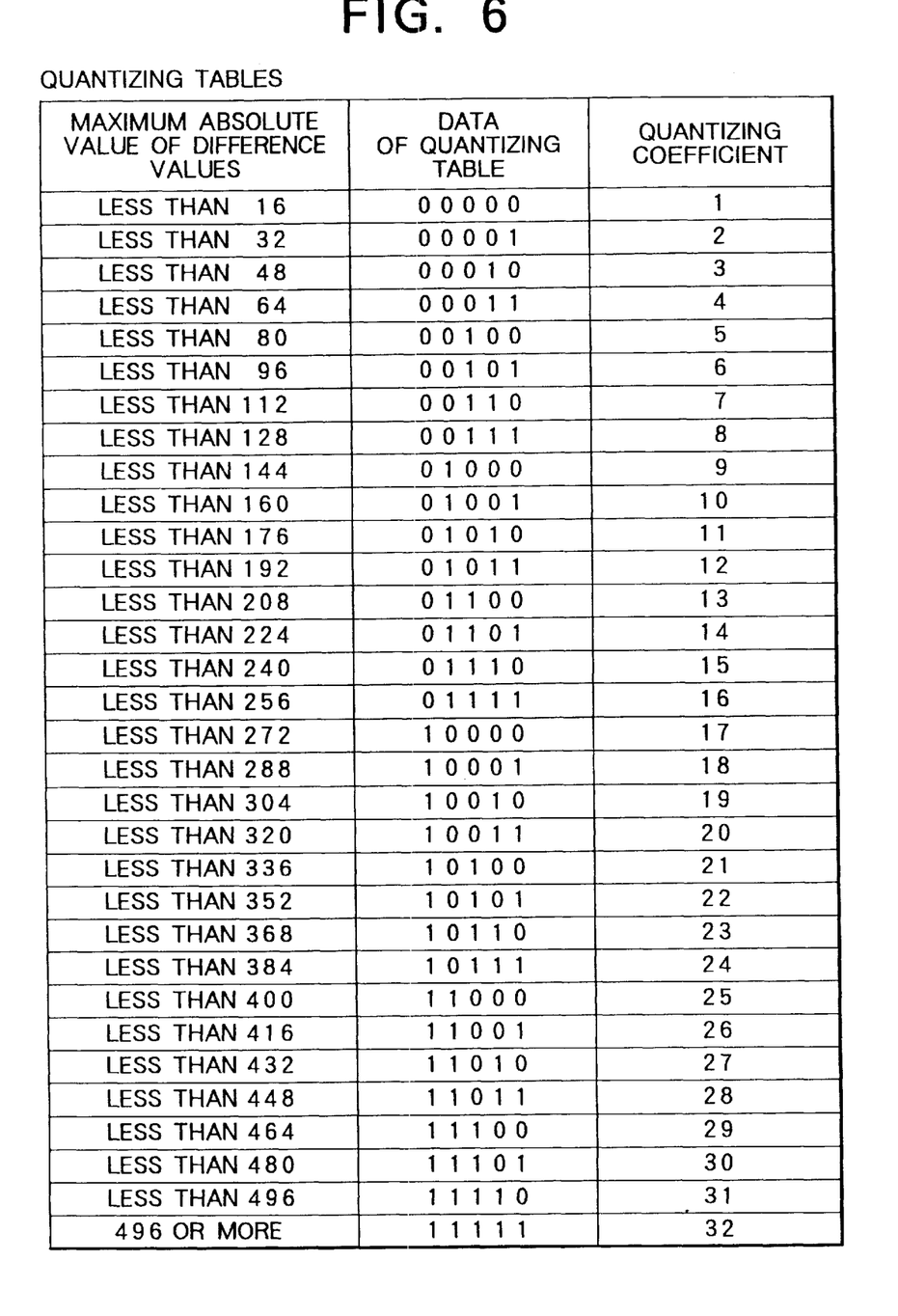
FIG. 6 is a common table for explaining a related art reference and the present invention.

FIG. 6 shows an example of 32 quantizing tables. With the 32 quantizing tables, a linear quantizing process can be accomplished. The quantizing table selecting means 13 shown in FIG. 2 detects a line that satisfies the condition of the left column shown in FIG. 6 with a feature of each pixel block with a fixed length of image data extracted from the feature extracting means 12 (for example, the maximum absolute value of the difference values of adjacent pixels) and supplies data of a quantizing table (five bits) of the detected line to the byte forming means 15 and the DPCM quantizing means 14.

For example, when the maximum absolute value of the difference values is less than 16, the quantizing coefficient "1" is selected. In this case, an error does not take place in the quantizing process and the inverse quantizing process. When the maximum value of the difference values is 16 or more and less than 32, the quantizing coefficient "2" is selected. In this case, the error is 1 or less. In most cases, the quantizing coefficient "1", where the maximum absolute value of difference values of adjacent pixels of each pixel block composed of horizontal eight pixels is very small and no quantizing error takes place, is often used. Thus, quantizing errors can be reduced.

Figure 7:
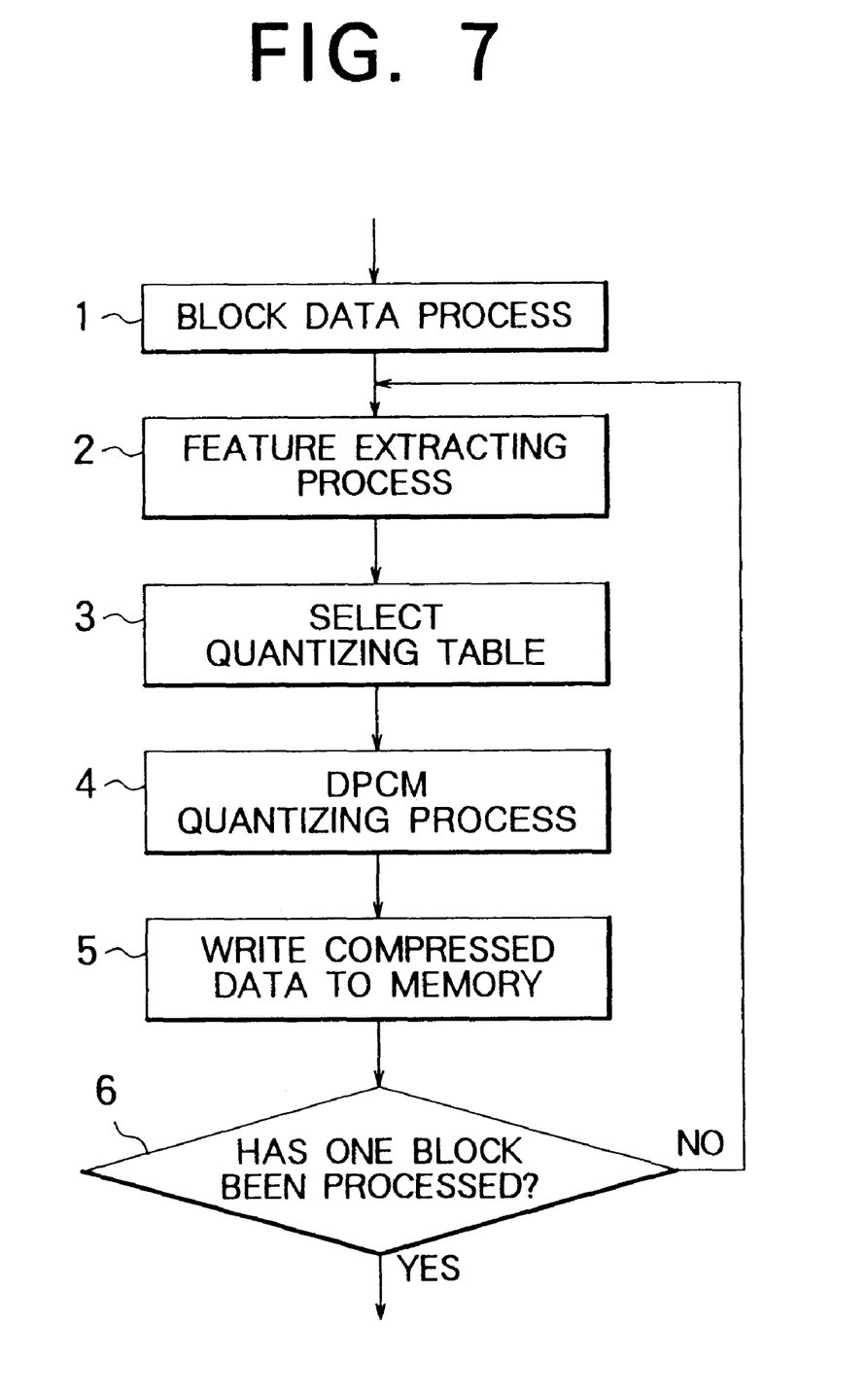
FIG. 7 is a flow chart showing a process for writing each block of compressed image data to a frame memory of the image decoding apparatus shown in FIG. 1.

FIG. 7 is a flow chart showing a process for writing each orthogonally transformed pixel block (8×8 pixels) of compressed image data to the frame memory 9 of the image decoding apparatus according to the embodiment of the present invention.

At step 1, MPEG compressed data is decoded as orthogonally transformed pixel block (8×8 pixels).

At step 2, the compressing portion 7 successively extracts a feature from each block (eight horizontal pixels) of the image data. At step 3, an optimum quantizing table is selected corresponding to the feature. Next, at step 4, a DPCM process and a quantizing process for difference values obtained by the DPCM process are performed. At step 5, the obtained compressed image data is written to the display memory 8 or the frame memory 9. The compressing portion 7 repeats the same processes for the next block with the fixed length of the image data. In this example, the processes are repeated eight times. When the entire block of image data has been compressed, the next block is decoded.

Thus, according to the image decoding apparatus according to the embodiment of the present invention, the value of an optimum quantizing table of which the quantizing error becomes the minimum is selected corresponding to a feature of each pixel block with a fixed length of the image data. With the value of the selected quantizing table, the DPCM value is quantized. Thus, the quantizing errors can be reduced. Consequently, the image quality of the decoded image can be improved. In addition, since the blank area of the memory that takes place in the compressing process for each block with a fixed length of image data is used for data of a quantizing table, the image quality of the decoded image can be improved without need to increase the storage capacity of the memory.

In this embodiment, the case in which encoded image data is compressed to 6/8 times the original data was described. Alternatively, when the compression ratio is designated to 5/8, since the blank area becomes 4 bits, 16 quantizing tables can be provided. In other words, the present invention can be applied for various compression ratios.

In the above-described embodiment, linear quantizing tables were used. However, it should be noted that the present invention can be applied in the case that non-linear quantizing tables are used.

In addition, according to the embodiment of the present invention, image data was compressed as pixel blocks with a fixed length (eight horizontal pixels). However, the present invention can be applied to a variable length compressing apparatus.

Moreover, according to the embodiment of the present invention, the memory is accessed with every one byte. Alternatively, when the memory is accessed with every 10 bits, the fixed length is a multiple (integer) of 10 bits.

Figure 8:
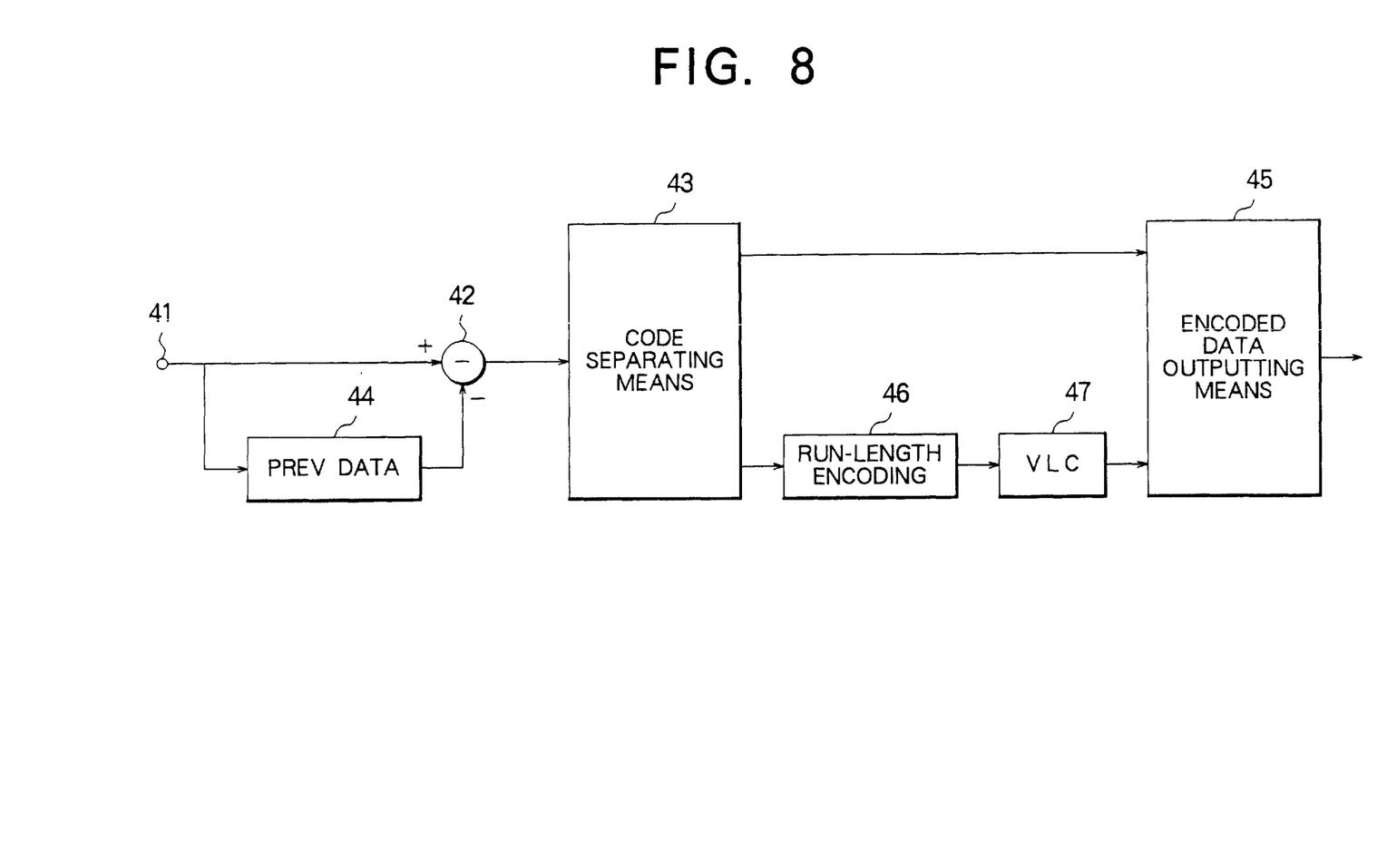
FIG. 8 is a block diagram showing a modification of the compressing portion of the image decoding apparatus shown in FIG. 1.

Next, a modification of the compressing portion 7 of the image decoding apparatus will be described.

FIG. 8 shows the structure of the compressing portion according to the modification. Referring to FIG. 8, encoded image data is received from the adder 5 shown in FIG. 1. The decoded image data is supplied to an inputting portion 41. A subtracter 42 obtains a difference value between each pixel block with a fixed length (eight horizontal pixels) of image data and previous pixel data stored in a memory 44 and supplies the obtained difference value to a code separating means 43. The code separating means 43 outputs eight bits of the first pixel data of the output data of the subtracter 42 and a code data of each difference value to an encoded data outputting means 45. In addition, the code separating means 43 supplies the absolute value of each difference value (8 bits×7) to a run-length encoding portion 46. The run-length encoding portion 46 performs a 0's run-length encoding process from the high order bits of the absolute difference value data (8 bits×7). The resultant run-length encoded data is supplied to a variable-length encoding portion (VLC) 47. The variable-length encoding portion 47 successively performs a variable-length encoding process for the run-length encoded data and supplies the variable-length encoded data to an encoded data outputting means 45. The encoded data outputting means 45 combines the first pixel data (eight bits), the code data of each difference value (seven bits), and at least part of the variable-length encoded data received from the variable-length encoding portion 47, forms fixed-length data composed of bits for integer bytes, and writes the fixed-length data to the display memory 8 or the frame memory 9 shown in FIG. 1.

Next, the operation of the compressing portion according to the embodiment will be described with reference to FIG. 9.

Figure 9:
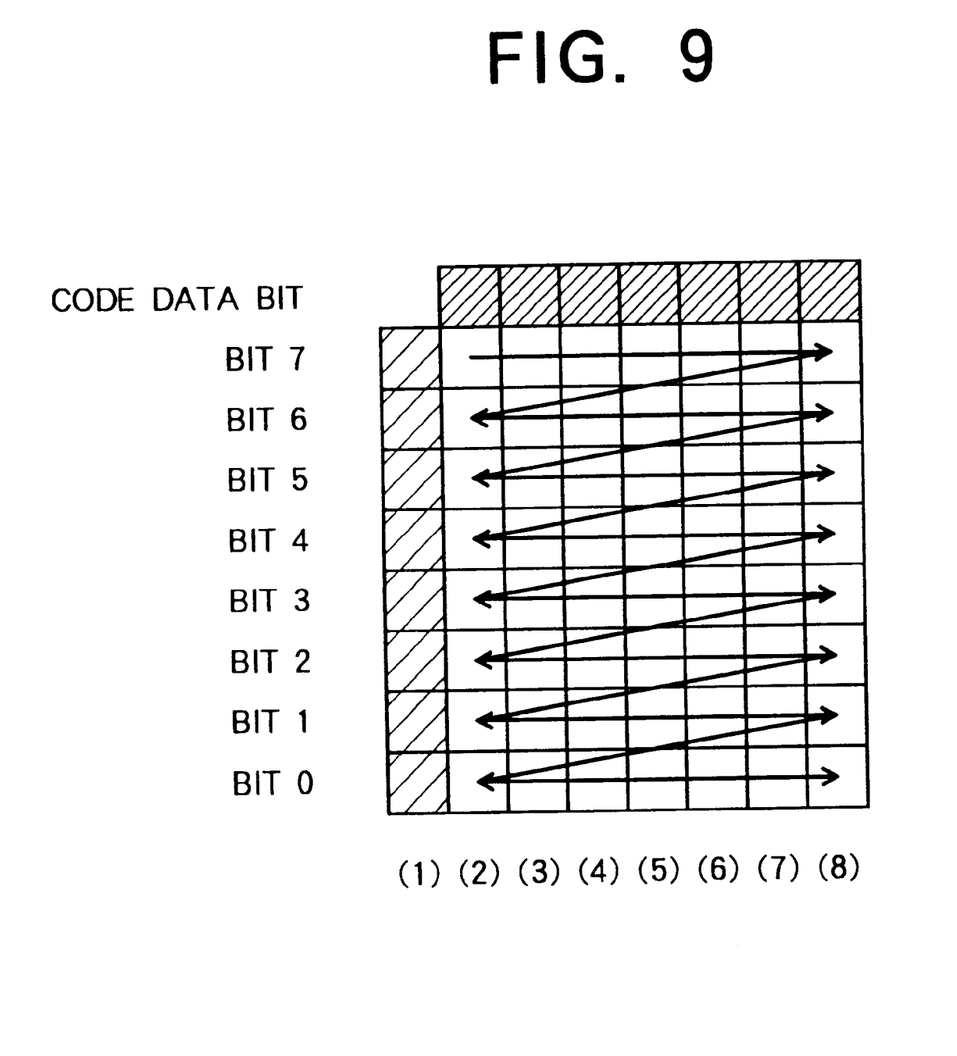
FIG. 9 is a schematic diagram for explaining an operation of the compressing portion shown in FIG. 8.

In FIG. 9, portions (1) to (8) represent eight horizontal pixels. In FIG. 9, bit 0 represents a low order bit of difference value data of each pixel, whereas bit 7 represents a high order bit thereof. In the DPCM process performed in the subtracter 42, of FIG. 8 the difference value data of each of pixels represented by portions (2) to (8) is composed of nine bits. The highest order bit of each of pixels represented by portions (2) to (8) is a code data. The other eight bits represent the absolute value of a relevant difference value. Portion (1) represents pixel data composed of eight bits.

Since most of difference values of adjacent pixels concentrate at small values, the high order bit of the absolute difference value is almost "0". Thus, in FIG. 8, when bits are arranged in the directions represented by arrows, many "0's" continue at the beginning. The number of successive "0's" is run-length encoded by the run-length encoding portion 46. The resultant data is variable-length encoded by the variable-length encoding portion (VLC) 47. Thus, the data is compressed.

The encoded data outputting means 45 outputs the first pixel data (eight bits) and the code data (seven bits) of each difference value with priority so as to output fixed-length compressed image data. The variable-length encoded data that is supplied from the variable-length encoding portion (VLC) 47 is stopped in the middle thereof. Even if the output of the variable-length encoded data to the memory is stopped in the middle, since high order bits that are important are encoded by the run-length encoding portion 46 with priority, the deterioration of the image quality of the decoded image is minimized.

In the embodiment, the MPEG decoding apparatus as an image processing apparatus with a frame memory was described. However, the present invention is not limited to such an apparatus. For example, the present invention can be applied to an MPEG encoding apparatus that writes compressed image data to a frame memory and performs an inter-frame compressing process. In addition, the present invention can be applied to various image processing apparatuses including image data compressing/expanding processes.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An image processing apparatus, comprising:

feature extracting means for extracting a feature of a pixel block of input image data, said pixel block comprising a predetermined number of pixels;

selecting means for selecting a quantizing coefficient corresponding to said extracted feature;

difference calculating means for obtaining difference values of adjacent pixels of each said pixel block of the image data;

quantizing means for quantizing the difference values with the selected quantizing coefficient and for outputting compressed image data; and adding means for adding data of said selected quantizing coefficient to said compressed image data and for generating compressed data with a fixed length composed of a multiple of memory access bits, wherein said compressed image data comprises a first compressed pixel data of one pixel of said pixel block and a second compressed pixel data of remaining pixels of said pixel block; and wherein said first compressed pixel data is compressed to a first predetermined bit length, and each pixel data of said second compressed pixel data is compressed to a second predetermined bit length.

2. The image processing apparatus as set forth in claim 1, further comprising:

means for storing the compressed data generated by said adding means.

3. The image processing apparatus as set forth in claims 1, wherein said feature extracting means extracts the maximum absolute value of difference values of adjacent pixels of each pixel block of the input image data as a feature of each pixel block of the input image data, wherein the quantizing coefficient is selected from a predetermined quantizing coefficient table containing a plurality of quantizing coefficients, and wherein the value of the quantizing coefficient selected is set smaller and adaptable to said maximum absolute value getting smaller.

4. The image processing apparatus as set forth in claim 1, wherein said difference calculating means includes:

inputting means for receiving pixel data of each pixel block;

memory means for storing the previous pixel data that is obtained prior to the pixel data received by the inputting means;

subtracting means for subtracting said stored previous pixel data from said received pixel data;

inversely quantizing means for inversely quantizing the compressed image data and for outputting inversely quantizing pixel data of each pixel block; and adding means for adding the inversely quantized pixel data and the stored previous pixel data, and for rewriting the stored previous pixel data by the added pixel data.

5. An image processing method, comprising:

extracting a feature of each pixel block of input image data, said pixel block comprising a predetermined number of pixels;

selecting a quantizing coefficient corresponding to said extracted feature;

obtaining difference values of adjacent pixels of each pixel block of the image data;

quantizing the difference values with the selected quantizing coefficient and outputting compressed image data; and adding data of said selected quantizing coefficient to said compressed image data and generating compressed data with a fixed length composed of a multiple of memory access bits, wherein said compressed image data comprises a first compressed pixel data of one pixel of said pixel block and a second compressed pixel data of remaining pixels or said pixel block; and wherein said first compressed pixel data is compressed to a first predetermined bit length, and each pixel data of said second compressed pixel data is compressed to a second predetermined bit length.

6. An image decoding apparatus, comprising:

variable-length decoding means for variable-length decoding image data encoded by inter-frame-prediction and for outputting variable-length decoded data;

inverse-quantizing means for inversely quantizing said variable-length decoded data and for outputting inversely quantized data;

inverse-DCT means for inversely orthogonally transforming said inversely quantized data and for outputting inversely orthogonally transformed data;

motion compensating means for outputting predicted image data;

adding means for adding said inversely orthogonally transformed data and said predicted image data, and for outputting added image data;

compressing means for compressing said added image data and for outputting compressed image data;

memory means for storing said compressed image data; and expanding means for expanding the stored compressed image data and for outputting expanded image data, wherein said motion compensating means compensates the motion of the expanded image data and outputs said predicted image data to said adding means;

wherein said compressing means includes:

feature extracting means for extracting a feature of each pixel block of input image data, said pixel block comprising a predetermined number of pixels;

selecting means for selecting a quantizing coefficient corresponding to said extracted feature;

difference calculating means for obtaining difference values of adjacent pixels of each said pixel block of the image data;

quantizing means for quantizing the difference values with the selected quantizing coefficient and for outputting compressed image data; and adding means for adding data of said selected quantizing coefficient to said compressed image data and for generating compressed data with a fixed length composed of a multiple of memory access bits;

wherein said compressed image data comprises a first compressed pixel data of one pixel of a pixel block and a second compressed pixel data of remaining pixels of said pixel block; and wherein said first compressed pixel data is compressed to a first predetermined bit length, and each pixel data of said second compressed pixel data is compressed to a second predetermined bit length.

* * * * *